A. O. LUNDELL.
VISCERA SEPARATING MACHINE.
APPLICATION FILED JULY 3, 1920.
1,365,708.
Patented Jan. 18, 1921.
3 SHEETS—SHEET 1.
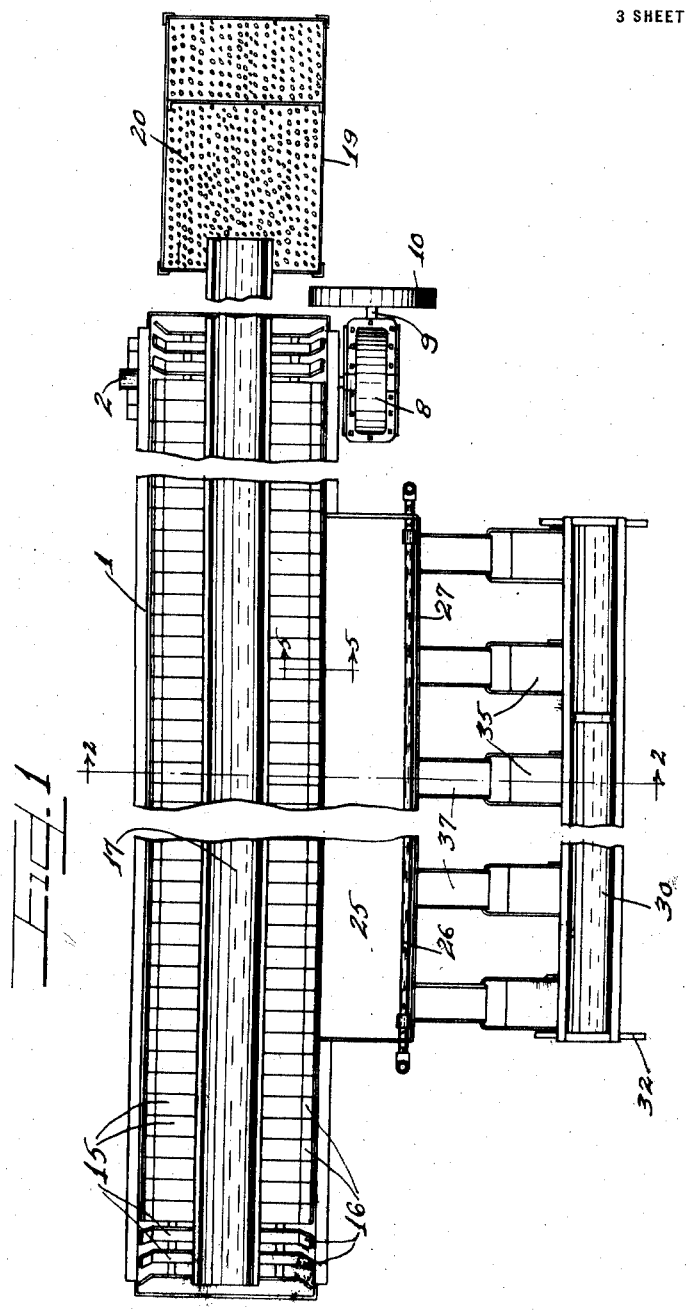

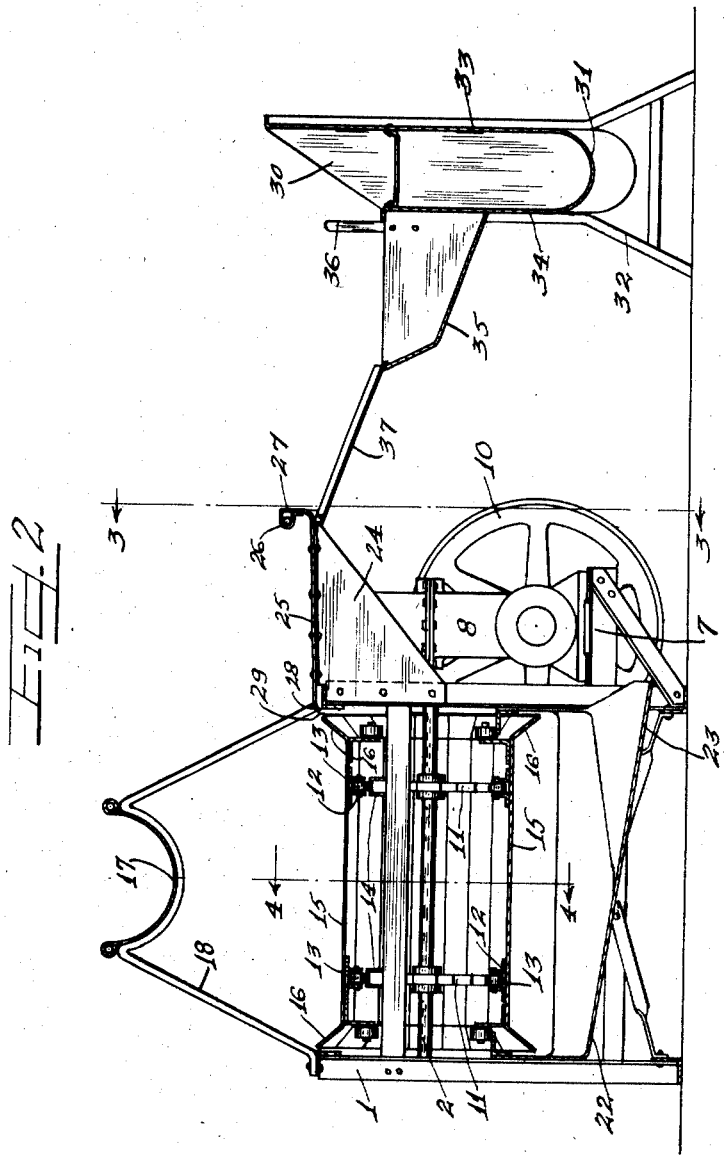

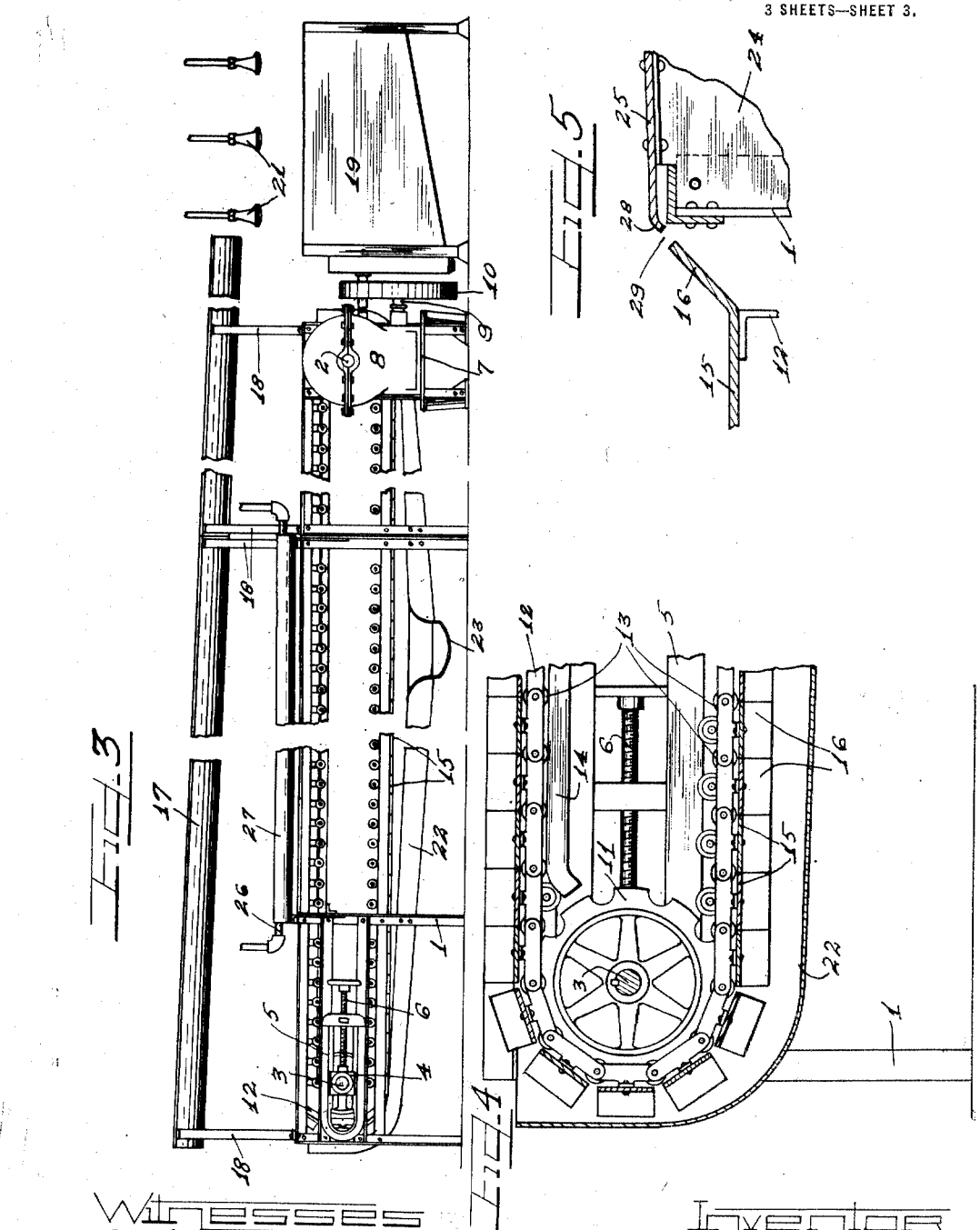

UNITED STATES PATENT OFFICE.

ALVIN O. LUNDELL, OF CHICAGO, ILLINOIS, ASSIGNOR TO THE ALLBRIGHT-NELL CO., OF CHICAGO, ILLINOIS, A CORPORATION OF ILLINOIS.

VISCERA-SEPARATING MACHINE.

1,365,708.   Specification of Letters Patent.   Patented Jan. 18, 1921.

Application filed July 3, 1920. Serial No. 393,943.

*To all whom it may concern:*

Be it known that I, ALVIN O. LUNDELL, a citizen of the United States, and a resident of the city of Chicago, in the county of Cook and State of Illinois, have invented certain new and useful Improvements in Viscera-Separating Machines; and I do hereby declare that the following is a full, clear, and exact description of the same, reference being had to the accompanying drawings, and to the numerals of reference marked thereon, which form a part of this specification.

In meat packing plants after eviscerators have removed viscera from carcasses the viscera are deposited on an inspection table to be examined. This invention relates more particularly to a viscera separating or dismembering machine adapted to receive viscera from an inspection table to permit the fat to be removed from dismembered parts and deposited in a fat washing tank while the separated parts are dropped into receiving troughs.

The object of this invention is to provide a viscera work table whereon all the work done upon the viscera by the butchers is performed, from the moment the complete viscera is deposited at the receiving end until the viscera is completely separated and the parts despatched to their proper receptacle or place of deposit.

It is an object of this invention to provide a viscera handling machine wherein the intestines are adapted to be removed from inspected viscera to permit stripping of the fat off of the intestines and depositing the intestines in a suitable container.

It is also an object of the invention to provide a machine constructed to conveniently permit a number of butchers to work at a spraying table to take viscera from an endless conveyer, and successively separate the various parts of the viscera, and then remove the fat from the separated parts and deposit said parts in suitable receiving troughs.

A further object of the invention is the construction of a viscera machine wherein an inclined fat receiving trough is positioned above a viscera conveyer in position to receive fat removed from sprinkled viscera drawn from the conveyer onto a sprinkled work table at the side of the conveyer, whereon the viscera are completely dismembered and the separated parts despatched onto different receiving receptacles.

Another important object of the invention is to provide a viscera conveyer machine with a sprayed work table and with a trough having pockets or bins secured thereto whereby the intestines removed from sprayed viscera on the work table are adapted to be coiled around pegs and tied as the fat is removed from the intestines and delivered to a fat washing vat.

Other and further important objects of this invention will be apparent from the disclosures in the specification and drawings.

The invention (in a preferred form) is illustrated in the drawings and hereinafter more fully described.

On the drawings:

Figure 1 is a fragmentary top plan view of a viscera separating machine embodying the principles of this invention.

Fig. 2 is a transverse sectional view thereof taken on line 2—2 of Fig. 1.

Fig. 3 is a fragmentary side elevation of the machine taken on line 3—3 of Fig. 2.

Fig. 4 is an enlarged fragmentary detail section of the conveyer taken on line 4—4 of Fig. 2.

Fig. 5 is a fragmentary detail section taken on line 5—5 of Fig. 1.

As shown on the drawings:

The reference numeral 1 indicates a supporting frame having a transverse shaft 2 journaled in suitable stationary bearings at the receiving end of the machine, and a transverse shaft 3 journaled in adjustably supported bearings 4 at the other or discharge end of the machine. The bearings 4 are slidably disposed within guide members or yokes 5 and are adapted to be adjusted there by means of screw bolts 6. Rigidly secured on the side of the frame 1 near the receiving end of the machine is a shelf 7 on which is supported a gear casing 8 containing gears connected with the shaft 2. A driving shaft 9 projects into the gear casing 8. Mounted on the projecting end of the driving shaft 9 is a pulley wheel 10 adapted to be driven by means of a belt connected with any suitable source of power, and adapted to cause pushing of the upper run of the conveyer table.

Secured on each of the shafts 2 and 3 are sprocket wheels 11, around which conveyer chains 12 are trained. The chains 12 are provided with rollers 13, which are adapted to run on guide tracks or rails 14 secured longitudinally of the supporting frame 1.

Attached transversely of the chains 12 are a plurality of flat cross members, slats or cleats 15, the ends of which are outwardly inclined to afford flanges 16. The slats 15 form a movable endless viscera conveyer, the upper run of which is pushed along so that the slats 15 of the upper run are pushed tightly against one another to form a non-leaking table support for the viscera.

Mounted longitudinally above the viscera conveyer is a long inclined fat trough or chute 17, the highest end as shown though, not necessarily being at the discharge end of the machine. The fat trough is semi-circular in cross section and is supported on the frame 1 by means of legs or braces 18. The lower or discharge end of the fat trough is open to permit fat deposited in the trough 17 to be discharged into a fat washing tub or vat 19 positioned adjacent the discharge end of the conveyer. The tub 19 is provided with an apertured screen 20. Mounted above the tub 19 are a plurality of spray nozzles 21 for spraying water on the fat deposited in said fat trough.

Rigidly supported on the frame 1 below the conveyer is a drain trough 22, the ends of which incline downwardly toward the middle of the frame. The lowest or middle part of the drain trough 22 is provided with a discharge spout 23 to permit water and refuse falling into the drain trough to flow into any suitable drain channel or basin positioned beneath the discharge spout.

Securely fastened to one side of the frame 1 are a plurality of bracket plates 24, which support a long work table 25 in places slightly inclined toward the frame 1. Mounted longitudinally of the work table 25 is a spray pipe 26, which is secured to a flange 27 formed on the work table at the outer margin thereof. The spray pipe 26 is connected with a source of water. The inner margin of the work table 25 is bent downwardly to form a drain flange 28 as shown in Fig. 5. Water and refuse from the work table is permitted to run over the drain flange 28 and drop into the drain trough 22 through the space 29 between the drain flange 28 and the inclined flanges 16 of the conveyer.

Disposed on one side and parallel to the conveyer frame 1 is an auxiliary trough 30 provided with a rounded inclined bottom 31 and supported by a frame 32. The outer wall 33 of the trough 30 is higher than the inner wall 34, as clearly illustrated in Fig. 2. Rigidly fastened to the trough wall 34 are a plurality of spaced bins 35. An upright peg or post 36 is rigidly secured to one of the corners of each bin 35 adjacent the auxiliary trough wall 34. Connecting the bins 35 with the work table 25 are a plurality of inclined trays or chutes 37 having side flanges.

The operation is as follows:

Inspected viscera are deposited upon the conveyer 15 from an inspection table. The conveyer is operated by means of a belt engaged around the pulley wheel 10 and connected with any suitable source of power. Rotation of the pulley wheel 10 causes operation of the gears within the gear casing 8, which in turn act to rotate the shaft 2 and the sprocket gears 11 mounted thereon to push the upper run of the conveyer table whereby the slats 15 are pushed together to form a non-leaking viscera support. The conveyer is actuated by the sprocket gears 11 on the driving shaft 2, and carries viscera past the work table 25. The machine is arranged to permit a plurality of butchers to work at the same time, with a butcher assigned to each of the chutes 37, so that a viscera deposited upon the receiving end of the conveyer is adapted to be completely dismembered by the butchers and the various parts deposited in receptacles. The spaces between adjacent spaced chutes afford stations for the butchers.

As a viscera is carried along by the conveyer 15 past the work table 25, a butcher draws the viscera onto the stationary work table 25, where the viscera is washed or sprayed by the water from the apertured spray pipe 26. The butcher separates the intestines from the remainder of the viscera and throws the remainder of the viscera back onto the conveyer 15 to permit the same to be carried to the next butcher who in turn removes another part of the viscera. The viscera are thus successively dismembered and the parts are deposited in suitable receptacles. A butcher having removed the intestines for example from a viscera removes or strips the fat from the intestines and throws the removed fat into the inclined chute or trough 17. The fat in the trough 17 slides into the tub 19 upon the perforated plate 20, where the fat is washed by water from the spray nozzle 21. As a butcher removes the fat from the intestines the stripped portions of the intestines are fed from a chute 37 into a bin 35. The butcher looping the intestine around the peg 36 until the entire intestine has been stripped of its fat. The coiled intestine is then tied together to prevent uncoiling of the same. The tied coiled intestine is next removed from the peg 36 and deposited into the auxiliary trough 30. The inclined bottom of the trough 30 permits the bundled or tied intestines to slide through an end of the trough to be removed or discharged through an end opening at the lower or deepest end of the trough. The different parts of a viscera, such as the heart, liver, intestines, etc., are each removed, and the fat stripped therefrom is deposited in the fat trough by the butchers, each of whom performs certain steps in the process of dismembering a viscera.

As a viscera is being dismembered on the work table 25, water from the pipe 26 is sprayed on the viscera. The water and refuse is permitted to run from the work table 25 over the flange 28 and drop through the space 29 into the drain trough 22 to be discharged from the spout 23 into a drain gutter.

If desired water may be run into the fat trough 17 to facilitate movement of the fat downwardly into the fat washing tub or bin 19. The machine affords a convenient arrangement whereby viscera after leaving an inspection table may be continuously washed while the butchers separate the various parts of the viscera for the purpose of stripping the fat therefrom, and then depositing the stripped parts into suitable containers. The intestines are coiled and tied so that the intestines from different viscera will not become entangled when deposited in the auxiliary trough 30.

I am aware that numerous details of construction may be varied through a wide range without departing from the principles of this invention, and I therefore do not purpose limiting the patent granted otherwise than necessitated by the prior art.

I claim as my invention:

1. A viscera separating machine comprising a viscera conveyer, a fat trough mounted thereabove, and a viscera separating table mounted at one side of said conveyer.

2. A viscera separating machine comprising a frame, a viscera conveyer thereon, a table secured to one side of said frame, means for spraying viscera on said table, and a trough supported on said frame above said conveyer for receiving fat removed from the viscera.

3. The combination with a frame, of a viscera conveyer thereon, a work table secured to one side of said frame, a fat trough mounted on said frame above the conveyer, and a fat washing bin at the end of the frame for receiving and washing fat from said trough.

4. The combination with a frame, of a viscera conveyer mounted thereon, a work table secured to one side of said frame, a fat trough mounted on said frame above the conveyer, means at the discharge end of the fat trough for washing the fat received from said trough, and a receiving trough connected with said work table for receiving parts of the viscera after the fat has been removed therefrom.

5. The combination with a supporting frame, of a viscera conveyer mounted thereon, a drain trough mounted on said frame below the conveyer, a table secured to one side of said frame adapted for dismembering viscera and removing the fat therefrom, means on said table for spraying the viscera on said table, an inclined fat trough mounted on said frame above the conveyer, means at the discharge end of said fat trough for washing the fat received from the fat trough, an auxiliary trough disposed to one side of said table, bins secured thereto, pegs mounted on said bins to permit coiling and tying of the intestines separated from the viscera, said coiled and tied intestines adapted to be deposited in said auxiliary trough, and inclined chutes connecting said bins with said table to facilitate handling of the intestines separated from the viscera.

6. A viscera dismembering machine comprising a viscera conveyer, stationary means at one side of the conveyer to permit dismembering of viscera and removal of the fat therefrom, means above the conveyer for receiving the removed fat, and means connected with said stationary means for receiving dismembered parts of the viscera after removal of the fat therefrom.

7. A viscera dismembering machine comprising a viscera conveyer, stationary means at one side of the conveyer to permit dismembering and removal of the fat from viscera taken from the conveyer, means for spraying the viscera while being dismembered, an inclined trough supported above the conveyer for receiving the removed fat, and an auxiliary trough connected with said stationary means adapted to receive dismembered viscera parts.

8. A viscera dismembering machine embracing a sanitary support whereon viscera are adapted to have the intestines removed and the fat stripped from the removed intestines, movable means for carrying viscera to said support, an inclined trough for receiving the fat removed from the intestines, an auxiliary trough connected with said support, and pegs thereon adapted to permit the intestines to be coiled and tied before being deposited in said auxiliary trough.

9. The combination with a supporting frame, of a viscera conveyer thereon, a drain trough on said frame below the conveyer, a sprayed table on said frame for dismembering viscera taken from the conveyer, and receiving devices above and at the side of said table for receiving the dismembered parts of the viscera.

10. The combination with a viscera dismembering table, means for spraying the viscera while the intestines are separated therefrom, an inclined receptacle for receiving the fat removed from the intestines, a trough for receiving the intestines, and means connecting said trough with said table adapted to facilitate coiling and tying of a removed intestine after the fat has been removed therefrom to keep the various intestines deposited in said trough from becoming entangled with one another.

In testimony whereof I have hereunto subscribed my name in the presence of two subscribing witnesses.

ALVIN O. LUNDELL.

Witnesses:
 LAWRENCE REIBSTEIN,
 EARL M. HARDINE.